Patented Sept. 27, 1949

2,483,371

UNITED STATES PATENT OFFICE 2,483,371

ESTERS OF PHTHALIDENEACETIC ACID AND METHODS FOR THEIR PREPARATION

David T. Mowry, Dayton, Ohio, assignor to Monsanto Chemical Company, St. Louis, Mo., a corporation of Delaware No Drawing. Application October 18, 1947,
Serial No. 780,769

12 Claims. (Cl. 260—344.6)

This invention relates to a new family of unsaturated esters having desirable properties as hereinafter described. More specifically, the invention relates to esters of phthalideneacetic acid.

Although the new family of compounds are derivatives of phthalideneacetic acid they cannot be prepared by the direct esterification of the acid, which may readily be prepared by the reaction of phthalic anhydride and acetic anhydride in the presence of anhydrous potassium acetate. The phthalideneacetic acid can, however, be converted to the corresponding acid chloride by reaction with thionyl chloride or other active chlorinating agent, such as, sulfuryl chloride, phosphorous trichloride, phosphorous pentachloride and sulfur dichloride, and then converted to the ester by reaction with the desired alkyl alcohol. Although any alkyl ester, including cetyl, lauryl and 2-ethylhexyl may be prepared in this manner, the invention is particularly directed to the methyl, ethyl, isopropyl, n-propyl, n-butyl, t-butyl, the various amyl, and the various hexyl, including the cyclohexyl, esters.

This new family of unsaturated esters can be polymerized, and especially in the presence of more active monomers, such as, acrylonitrile, styrene, vinyl chloride, and the esters of acrylic acid. The copolymers of styrene and the esters of phthalideneacetic acid are particularly important because said copolymers are subject to less heat distortion than polystyrene. The copolymers of styrene and the new compounds are valuable fiber forming materials because of the improved resistance to the usual effects of increased temperature.

Further details of the preparation of the new compound are set forth in the following specific examples:

Example 1

A mixture of 90 parts by weight of phthalic anhydride, 120 parts of acetic anhydride and 60 parts of anhydrous potassium acetate was charged to a reaction flask and gradually heated to a temperature of 150–160° C. After maintaining this temperature for fifteen minutes the reaction mass was cooled and treated with 300 parts of hot water. The phthalideneacetic acid was precipitated as a yellow solid and thereafter washed with hot water and alcohol until colorless.

A 75 gram portion of the phthalideneacetic acid was placed in a reaction flask equipped with a reflux condenser. While the flask was maintained at 70° C. by immersion in a water bath, 160 grams of thionyl chloride were gradually added over a three hour period. When all of the reagents were mixed, temperature was raised to 90° C. to complete the reaction. After the acid had dissolved completely and the evolution of gaseous reaction products had subsided, the flask was cooled and the excess thionyl chloride removed by evacuation with a water pump. The resulting product was the acid chloride of phthalideneacetic acid.

The crystalline acid chloride was triturated with 750 cc. of absolute ethyl alcohol at a temperature of 10–15° C. The resulting product was filtered, washed and finally recrystallized from benzene solution. The resulting pale yellow crystals were identified as ethyl phthalideneacetate and had the molecular structure:

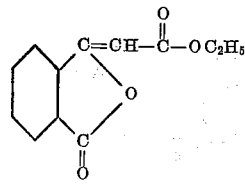

Example 2

Using the procedure set forth in the preceding example another portion of phthalideneacetic acid was reacted with thionylchloride and then with anhydrous methanol to form a solid chemical compound (M. P. 168–169° C.). This new ester was identified as methyl phthalideneacetate and had the chemical structure:

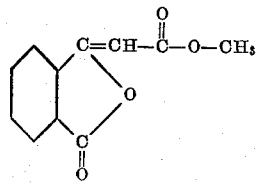

Example 3

Using the procedures described in the preceding examples a 70 gram portion of crude phthalideneacetyl chloride was treated with 250 cc. of n-hexanol and warmed to 60° C. for one-half hour. The resulting oily product was distilled at an absolute pressure of 3 mm. and a temperature of 208–210° C. The resulting ester was identified as n-hexyl phthalideneacetate and had a molecular structure:

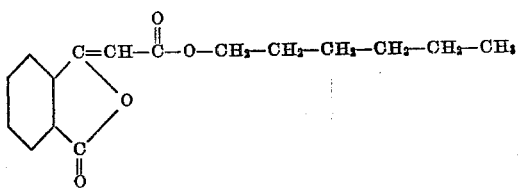

Although the invention has been described with respect to specific embodiments thereof, it is not intended that the details shall be construed as limitations upon the scope of the inventions except to the extent incorporated in the following claims.

What I claim is:

1. An ester of phthalideneacetic acid having the structure:

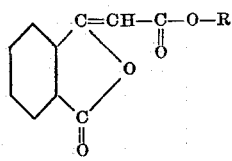

wherein R is an alkyl radical.

2. An ester of phthalideneacetic acid having the structure:

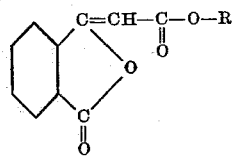

wherein R is an alkyl radical having from one to six carbon atoms inclusive.

3. Methyl phthalideneacetate having the structure:

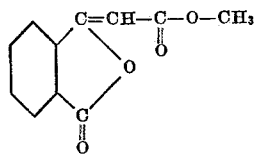

4. Ethyl phthalideneacetate having the structure:

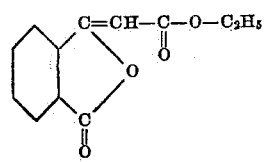

5. Hexyl phthalideneacetate having the structure:

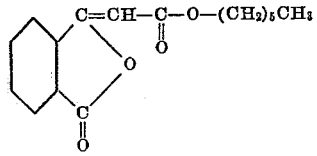

6. A method of preparing alkyl ester of phthalideneacetic acid which comprises treating phthalideneacetic acid with thionyl chloride and subsequently reacting the resulting compound with alkyl alcohol.

7. A method of preparing alkyl ester of phthalideneacetic acid which comprises treating phthalideneacetic acid with thionyl chloride and subsequently reacting the resulting compound with an alkyl alcohol having from one to six carbon atoms.

8. A method of preparing methyl phthalideneacetate which comprises treating phthalideneacetic acid with thionyl chloride and subsequently reacting the resulting product with methyl alcohol.

9. A method of preparing ethyl phthalideneacetate which comprises treating phthalideneacetic acid with thionyl chloride and subsequently reacting the resulting product with ethyl alcohol.

10. A method of preparing hexyl phthalideneacetate which comprises treating phthalideneacetic acid with thionyl chloride and subsequently reacting the resulting product with n-hexyl alcohol.

11. A method of preparing an alkyl ester of phthalideneacetic acid which comprises reacting the acid chloride of phthalideneacetic acid with an alkyl alcohol.

12. A method of preparing an alkyl ester of phthalideneacetic acid which comprises reacting the acid chloride of phthalideneacetic acid with an alkyl alcohol, having from one to six carbon atoms.

DAVID T. MOWRY.

REFERENCES CITED

The following references are of record in the file of this patent:

UNITED STATES PATENTS

| Number | Name | Date |
| --- | --- | --- |
| 2,047,946 | Austin et al. | July 21, 1936 |